No. 828,357. PATENTED AUG. 14, 1906.
J. M. WAUGH.
VEHICLE SPRING.
APPLICATION FILED FEB. 20, 1905.
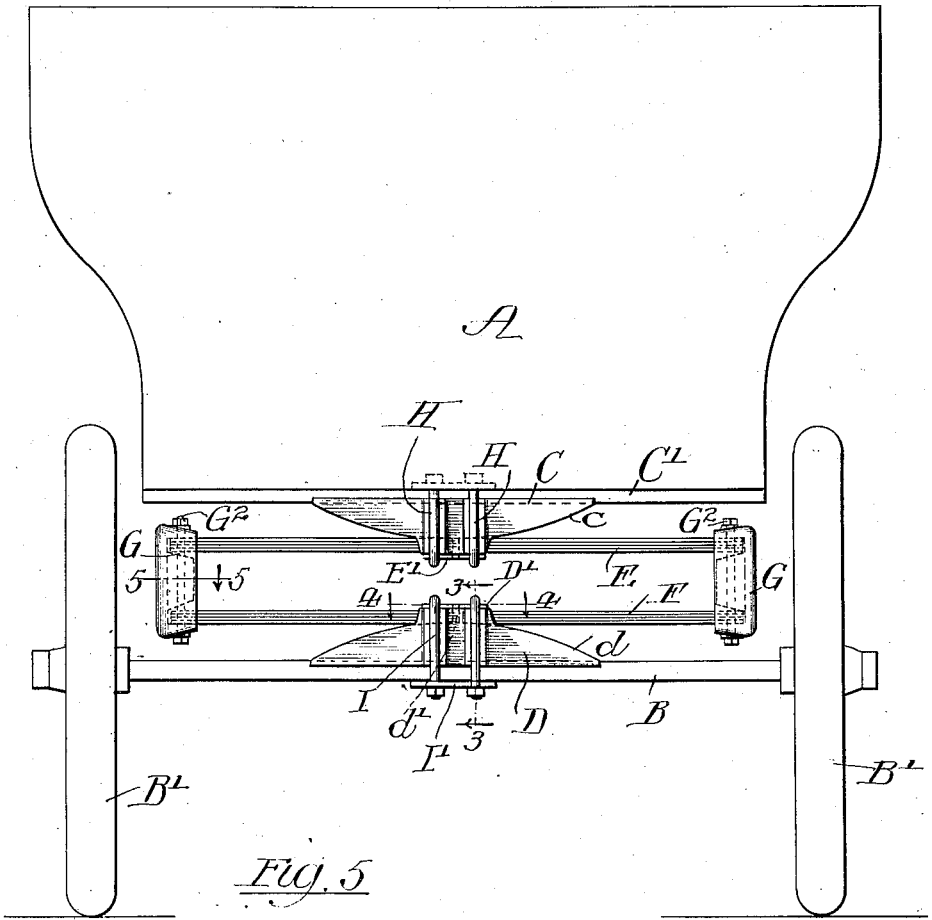
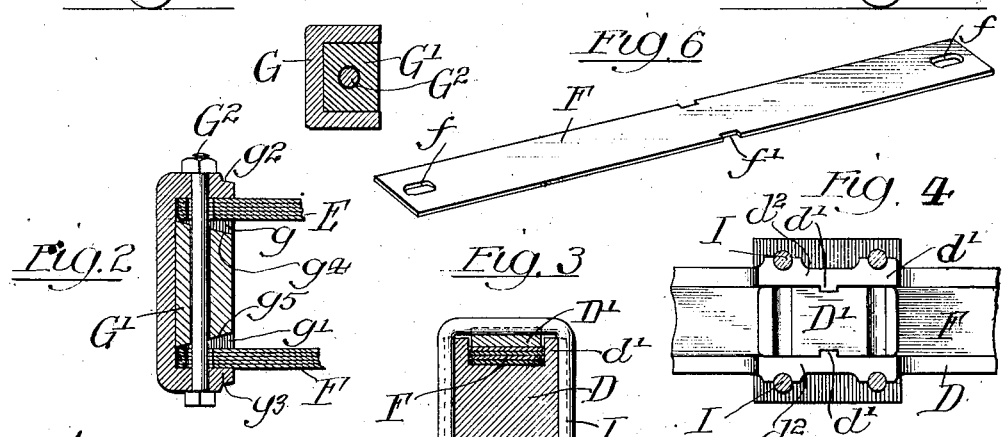
Witnesses:
Inventor:
James Milton Waugh
by Poole & Brown his Attys

UNITED STATES PATENT OFFICE.

JAMES MILTON WAUGH, OF CHICAGO, ILLINOIS.

VEHICLE-SPRING.

No. 828,357.  Specification of Letters Patent.  Patented Aug. 14, 1906.

Application filed February 20, 1905. Serial No. 246,602.

*To all whom it may concern:*

Be it known that I, JAMES MILTON WAUGH, a citizen of the United States, residing at Chicago, in the county of Cook and State of Illinois, have invented certain new and useful Improvements in Vehicle-Springs; and I do hereby declare that the following is a full, clear, and exact description thereof, reference being had to the accompanying drawings, and to the letters of reference marked thereon, which form a part of this specification.

This invention relates to improvements in vehicle-springs of that class embracing a plurality of spring-plates and which are more especially intended for use in connection with automobiles or other heavy vehicles, although adapted for use on vehicles of all kinds.

The invention consists in the matters hereinafter described, and pointed out in the appended claims.

In the accompanying drawings, illustrating my invention, Figure 1 is a rear view of an automobile provided on the rear of its body with a spring embodying my invention. Fig. 2 is a detail vertical longitudinal section through the socket-bar which joins the upper and lower sets of plates at one end of the spring. Fig. 3 is a transverse vertical section taken upon line 3 3 of Fig. 1. Fig. 4 is a horizontal section taken on line 4 4 of Fig. 1. Fig. 5 is a detail section taken upon line 5 5 of Fig. 1. Fig. 6 is a perspective view of one of the steel plates or leaves of the spring.

As shown in said drawings, A indicates the vehicle-body, B the rear axle of the vehicle, and B' B' the wheels thereof. The drawings illustrate a single spring embodying my invention as applied between the center of the rear axle and the center of the rear of the vehicle-body and extending in a direction parallel with these parts; but it will be understood that a spring or springs of like construction may be applied in any other desired manner between the body of the vehicle and the axle or running-gear thereof as may be found necessary or desirable to properly support the vehicle-body.

C indicates an upper saddle-block which is attached to the body A, and D a lower saddle-block attached to the axle B. The saddle-block C is provided with a lower convex surface $c$, while the lower saddle-block D is provided with an upper convex surface $d$. The saddle-blocks C and D are arranged parallel with each other and longitudinally of the axle B and of the rear end of the body A. Attached to the lower surface of the saddle-block C, at the center thereof, is a set of horizontally-arranged spring-plates E, and attached to the center of the convex surface $d$ of the saddle-block D is a like series or set of spring-plates F.

The two sets of spring-plates E and F each consist of a plurality of thin steel plates of equal length and arranged face to face or in contact with each other throughout the entire length of the same. The said sets of plates E and F are clamped or secured at their middle parts to the saddle-blocks C and D and are arranged generally parallel with each other. The outer ends of said sets of plates are connected or joined by means of upright socket members G G, each provided in their inner faces with sockets or recesses $g\ g'$, adapted to receive the ends of the spring-plates, and with means for holding or confining the ends of said spring-plates in said sockets. The upper and lower walls of said sockets $g\ g'$ are inclined with respect to each other and are outwardly divergent. The inner ends of the sockets are made of the same vertical width as the thickness of the sets of plates E and F, so that the ends of each set of plates are by engagement with said sockets held or restrained from vertical movement relatively to the socket-bars. Moreover, the top bearing-surface $g^2$ of the upper sockets and the bottom bearing-surfaces $g^3$ of the lower sockets are horizontal, while the lower bearing-surfaces $g^4$ of the upper sockets are downwardly and inwardly inclined and the top bearing-surfaces $g^5$ of the lower sockets $g'$ are upwardly and inwardly inclined.

It follows from the above construction that the top bearing-surface $g^2$ of the upper sockets and the bottom surface $g^3$ of the lower socket are parallel with the top and bottom plates of the sets E and F, while the inclined surfaces $g^4$ and $g^5$ of the said upper and lower sockets are engaged at their inner ends only with the extreme ends of the inner plates of said sets E and F.

The result of the general construction above described is that when downward pressure or tension is brought upon the spring through depression of the vehicle-body, as in passing over rough places or elevations of a road, both sets of springs E and F are flexed in such manner as to bring their middle parts toward each other. Moreover, by reason of the inclination of the bearing-surfaces $g^4$ $g^5$ the latter are in contact at their outer ends only with the extreme ends of the innermost spring-plates, and when the two sets of spring-plates are flexed or bowed inwardly, so as to bring their middle parts toward each other and their end portions in outwardly-divergent relation, such flexing of the sets of spring-plates is not interfered with or restricted by reason of the confinement thereof in the said sockets $g$ $g'$; but the said end portions of the said sets of spring-plates are free to take an angular position relatively to the socket-bars G G, as the sets of plates are so inwardly bent or flexed.

It will also be apparent that the springs constructed as described will have a tendency to check or lessen the upward movement of the vehicle-body in the rebound, because the tapered form of the sockets $g$ $g'$ is adapted to permit the springs to be flexed toward each other at their middle parts much more easily than to bend in the opposite direction or in such manner that they assume an outwardly-bowed form and spread apart at their middle portions. This effect is due to the fact that the inner parts of the top bearing-surface $g^2$ of the upper socket and the lower bearing-surface $g^3$ of the lower socket are when the springs are straight or unflexed in contact with the outer surfaces of the springs at a considerable distance inwardly from the ends of the springs, so that an upward flexure of the center of the upper sets E or a downward flexure of the center of the lower set F will be resisted by the bearing of the end portions of said sets of springs against the said inner parts of the surfaces $g^2$ $g^3$, it of course being understood that the extreme outer ends of the sets of springs are held from any vertical movement by their engagement with each inner end of the sockets. In other words, by the presence of the horizontal bearing-surfaces $g^2$ and $g^3$, which bear on the outer faces of the spring-plates at points distant from the ends of the latter when said spring-plates are straight or in the form assumed thereby under normal conditions or under a normal load, a double flexure of the sets of springs takes place when the sets of springs are spread apart or outwardly bowed, while a single flexure only takes place when the springs are brought together or inwardly bowed.

It follows from the above that the two sets of springs E and F may be more easily flexed inward than outward, because the sockets $g$ $g'$ are so shaped as to facilitate the inward flexure, but resist the outward flexure of the spring-plates. As a consequence the spring as a whole is adapted to yield with a desired freedom with the descent of the vehicle-body, and thus ease the shock or jar when the wheels drop from an elevation into a depression or rut, while subsequent rebound of the body above its normal position is checked or resisted by the enhanced resistance afforded by the bearing-surfaces $g^2$ $g^3$ to the flexure of the springs in a direction to permit the rising of the vehicle-body above its normal position. It will be apparent, moreover, that inasmuch as the several spring-plates constituting the sets E and F are held or clamped in contact with each other by the attaching devices securing them to the saddle-blocks C D and inasmuch as the end portions of both sets of spring-plates are pressed together when the sets of springs are bent or flexed in either direction from the straight or normal condition any flexing or bowing of the sets of plates is necessarily accompanied by sliding of the several plates upon each other, with consequent frictional resistance tending to prevent or resist such sliding movement and to check or retard the quick bending or flexure of the sets of springs as a whole. The springs described, therefore, while having the necessary degree of resiliency required to lessen the jolting or jarring of the vehicle-body and consequent discomfort to its occupants, will have a less tendency to quickly or suddenly rebound after being extremely flexed than in the case of a leaf-spring in which the leaves are of varying lengths, because the frictional resistance to the relative endwise movement of the several spring-plates will tend to prevent a quick return or straightening movement of the sets of spring-plates. As a consequence, therefore, the springs described will have a decreased tendency to throw the vehicle-body upwardly in the rebound after it has been depressed by a sudden dropping of the vehicle-wheels.

A spring embodying the general features of construction above described may be variously constructed so far as details are concerned. In the particular spring illustrated the upper set of spring-plates E is secured to the saddle-block C by means of a cap-plate E', applied beneath the springs, and two stirrup bolts or clips H H, extending at either side of the saddle-block and across the cap-plate E' and secured at their upper ends to the cross-piece B' of the vehicle-body. Likewise the lower set of spring-plates F is secured to the top of the saddle-block D by means of a cap-plate D', Fig. 3, which is clamped against the spring-plates by means of two stirrup-irons I, which pass at either side of the saddle-block and the axle B and are engaged at their ends with a plate I', located beneath the axle.

In the details of construction in the socket-bars G G, (illustrated and clearly seen in Figs. 2 and 5,) they are provided at their inner faces with longitudinal recesses extending between the bearing-surfaces $g^2$ and $g^3$, and in said recess between the ends of the said spring are located filling-blocks G', the ends of which are beveled to form the inclined bearing-surfaces $g^4$ $g^5$. The means illustrated for holding the filling-blocks in place and the sets of spring-plates in engagement with the socket-bars consists of bolts $G^2$, inserted endwise through said socket-bars G and the filling-blocks G' and also passing through apertures in the ends of said plates, such as are indicated by $ff$ in Fig. 6.

In order to center the spring-plates or to hold them from endwise movement on the saddle-block, said plates are shown as provided in their side edges with central notches, such as are indicated by $f'$ in Fig. 6. Said notches engage upright ribs formed on lateral flanges, which extend from the saddle-block at the sides of the sets of spring-plates and form grooves or seats for the said plates, said ribs being indicated by $d'$ in Fig. 4 and the flanges to which they are attached by $d^2$ in Figs. 3 and 4.

The convex bearing-surfaces $c$ and $d$ on the saddle-blocks D and E, over which the spring-plates are bent when inwardly flexed, have the important advantage when employed in connection with straight spring-plates of gradually increasing the resistance of the spring-plates to bending or flexure as the curvature of the springs is increased, it being manifest that as the plates are bent or turned inwardly the parts of the spring-plates in contact with the said convex surfaces will be gradually increased in length, and the flexibility of the end portions will be correspondingly decreased, the unbent parts of said end portions being, in effect, shortened, and therefore made stiffer as the curvature of the plates increases. It follows that the saddle-blocks having curved bearing-surfaces, as described, have the effect of producing a practically increasing resistance in the springs as the weight or load on the springs is increased, either by an increase in the weight caused by the vehicle-body or by excessive jolting of the vehicle as a whole. It is to be understood, however, that so far as the general advantages gained by the frictional engagement of the spring-plates with each other and by the making of the socket members with parallel bearing-surfaces $g^2$ $g^3$ are concerned the saddle-blocks need not have such convex bearing-surfaces.

In case the spring be applied transversely to the axle instead of parallel therewith, as shown, the shape of the saddle-blocks may be modified and the means for attaching the saddle-blocks to the vehicle body and axle varied to suit the requirements of any particular case.

It will be understood that a spring embodying the principal features of my invention may be a single spring instead of a double spring, as shown, or, in other words, it may embrace only one set of spring-plates operating in connection with members having sockets to receive the ends of the spring-plates and operating as hereinbefore described.

While the drawings show the socket bars or members as having sockets to receive the ends of the spring-plates provided with opposite divergent bearing-surfaces, yet it will be understood that the operative parts of said divergent bearing-surfaces consist, essentially, in the two inner opposed parts of the bearing-surfaces at the inner ends of the sockets, which are always in contact with the end portions of the spring-plates and hold the said end portions from movement relatively to the socket-bar, together with a part of one of said bearing-surfaces, such as the outer marginal part of the surface $g^2$ or $g^3$, which is adapted for contact with the spring-plate at a point at some distance inwardly from its outer end when the spring is unflexed and which acts in connection with the opposed parts at the inner end of the socket to produce double flexure of the spring-plates and consequent enhanced resistance to the bending of the spring. It follows that the results hereinbefore described, so far as is concerned the production of a greater resistance to flexure of the spring-plates in one direction than the other, will be obtained when the socket member is provided with two parts or surfaces adapted for contact with the opposite sides of the spring-plates at or near their outer ends and a third part or surface adapted for contact with the spring-plates at some distance inwardly from their outer ends when the spring-plate is unflexed and which, by its coaction with the part or surface engaging the opposite side of the spring-plates at or near their ends, results in a double or reverse flexure and consequent increased resistance to the bending or bowing of the spring in one direction which does not take place when the spring-plates are bent or bowed in the opposite direction. It is therefore to be understood that the appended claims are intended to cover the socket-bars provided with parts or surfaces engaging the spring-plates at both sides thereof at or near their ends and also engaging said spring-plates at one side thereof at a distance from their ends whether the said bearing or contact surfaces are provided on the socket members by the particular construction shown or otherwise.

I claim as my invention—

1. A vehicle-spring embracing a set of spring-plates of equal length, arranged in contact with each other, a saddle-block to which the spring-plates are centrally secured, and two socket members provided with sockets adapted to receive the ends of said spring-plates, said sockets having opposed inwardly-divergent top and bottom surfaces, the outer ends of which are located at a distance from each other equal to the combined thickness of the ends of the spring-plates.

2. A vehicle-spring embracing a spring-plate, a saddle-block to which said spring-plate is centrally secured, and two socket members having opposed bearing-surfaces engaging opposite sides of the spring-plate at or near its ends and one side of said spring-plate at a distance from its ends.

3. A vehicle-spring embracing a set of spring-plates of equal length, arranged in contact with each other, a saddle-block to which the spring-plates are centrally secured, and two socket members having opposed bearing-surfaces engaging opposite sides of the set of spring-plates at or near their ends and one side of said set of plates at a distance from its ends.

4. A vehicle-spring comprising two spring-plates, saddle-blocks, to which the spring-plates are centrally secured, and two socket-bars joining the ends of the spring-plates and provided with sockets to receive the ends of the same, said socket-bars having opposed bearing-surfaces in contact with opposite sides of the spring-plates at or near their ends and with the outer sides of said spring-plates at a distance from their ends when the plates are unflexed.

5. A vehicle-spring comprising two sets of spring-plates of equal length arranged in contact with each other, saddle-blocks to which the spring-plates are centrally secured, and two socket-bars joining the ends of the sets of spring-plates and provided with sockets to receive the ends of the same, said socket-bars having opposed bearing-surfaces in contact with opposite sides of the sets of plates at or near their ends and with the outer faces of said spring-plates at a distance from their ends when the latter are unflexed.

6. A vehicle-spring comprising two separated spring-plates, two saddle-blocks to which the said plates are centrally secured, and two socket-bars joining the ends of said plates and provided with sockets to receive the ends of the same, and means for holding the ends of the spring-plates within said sockets.

7. A vehicle-spring comprising two sets of spring-plates, saddle-blocks to which the spring-plates are centrally secured, and two socket-bars joining the ends of the sets of spring-plates and provided with sockets to receive the ends of the same, and means for holding the ends of the spring-plates within said sockets.

8. A vehicle-spring comprising two spring-plates, two saddle-blocks to which the spring-plates are centrally secured, two socket-bars provided with longitudinal recesses in their inner faces and with filling-blocks having beveled end surfaces and bolts inserted through said socket-bars and filling-pieces and through the ends of said spring-plates.

9. A vehicle-spring comprising two sets of spring-plates, two saddle-blocks to which the spring-plates are centrally secured, two socket-bars provided with longitudinal recesses in their inner faces and with filling-blocks having beveled end surfaces, and bolts inserted through said socket-bars and filling-pieces and through the ends of said spring-plates.

10. A vehicle-spring comprising a spring-plate, a central saddle-block provided with a convex bearing-surface for contact with said plate, and socket members engaging the ends of said spring-plate.

11. A vehicle-spring comprising two sets of spring-plates, two central saddle-blocks provided on their adjacent faces with convex bearing-surfaces for contact with said spring-plates, and bars connecting the ends of said spring-plates.

In testimony that I claim the foregoing as my invention I affix my signature, in presence of two witnesses, this 16th day of February, A. D. 1905.

JAMES MILTON WAUGH.

Witnesses:
C. CLARENCE POOLE,
G. R. VILKINS.